Oct. 2, 1934.  C. R. LAW  1,975,586

BACK REST

Filed July 26, 1932

Inventor
Charles R. Law.
Hardway Mather
Attorneys

Patented Oct. 2, 1934

1,975,586

UNITED STATES PATENT OFFICE 1,975,586

BACK REST

Charles R. Law, Mansfield, La.

Application July 26, 1932, Serial No. 624,710

1 Claim. (Cl. 155—182)

This invention relates to a back rest.

An object of the invention is to provide a back rest of the character described specially designed for use by automobilists for supporting the back while driving, or riding in, a motor vehicle.

Another object of the invention is to provide a resilient or yieldable back rest, which will add to the comfort of the user and which is of such construction that the air may readily circulate therethrough so that the clothing of the user will not become soiled from perspiration.

A further object of the invention is to provide a back rest of the character described that will act as a shock absorber and will relieve the user of much of the vibration incident to motor vehicle travel.

The article, while primarily intended for use as a back rest, may also serve as a pillow, or cushion, for general use.

With the above and other objects in view, the invention has particular relation to certain novel features of construction, arrangement of parts and use, an example of which is given in this specification and illustrated in the accompanying drawing, wherein.

Figure 1:
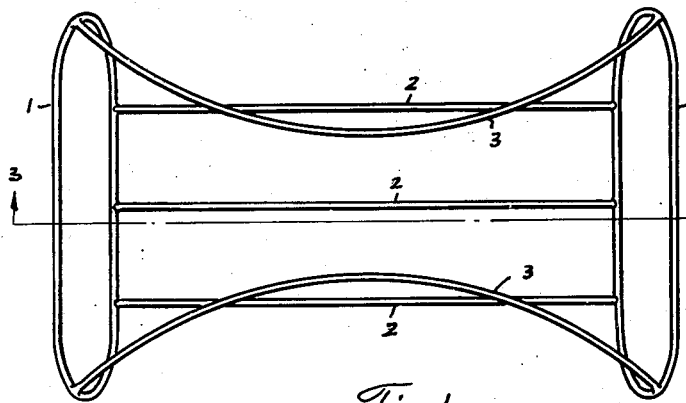
Figure 1 shows a front elevation of the skeleton framework.
Figure 2:
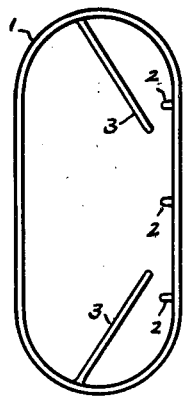
Figure 2 shows an end view thereof.
Figure 3:
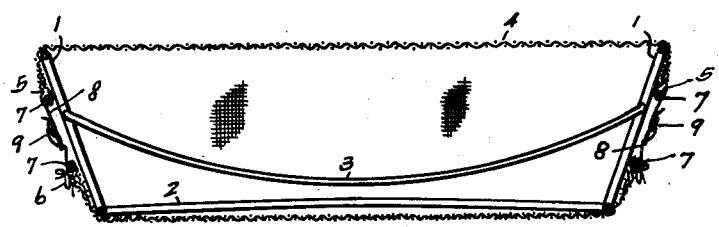
Figure 3 shows a longitudinal sectional view, taken on the line 3—3 of Figure 1, and showing the covering thereon.
Figure 5:
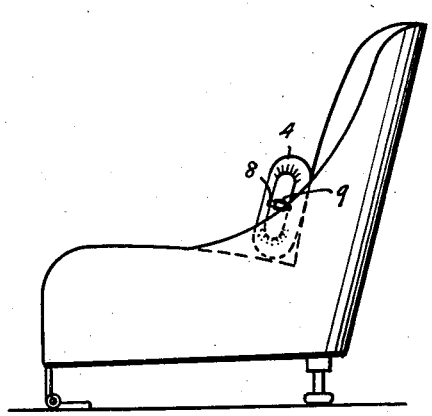
Figure 5 shows an end view thereof as mounted for use on a motor vehicle seat.

Referring now more particularly to the drawing wherein like numerals of reference designate similar parts in each of the figures the numerals 1, 1 designate the ends of the framework which are preferably of a substantially elliptical shape. The ends are preferably formed of strong steel rod or wire, and their rear sides are connected by a plurality, preferably three, of rods 2, which are slightly inwardly curved. The upper and lower ends of the end members 1 are connected by the arcuate inwardly curved top and bottom rods 3, 3 which lie in planes that converge rearwardly as more clearly indicated in Figure 2. The rods 2 and 3 are also preferably formed of spring steel and the rods 3 have considerably more curvature than the rods 2. The rods 3 are somewhat longer than the rods 2 so that the ends 1 will lie in forwardly diverging planes, as more clearly illustrated in Figure 3 and so that the back rest will readily conform to the shape of the back of the individual seats with which motor vehicles are commonly equipped, as illustrated in Figure 5.

Figure 4:
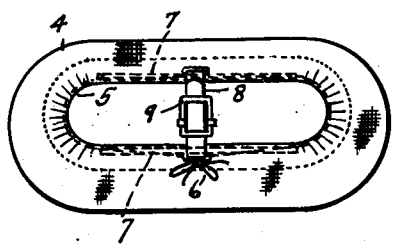
Figure 4 shows an end view of the complete article.

A flexible covering 4 is fitted over the skeleton framework above described. This covering may be of loosely woven fabric or other flexible foraminated material. This cover is open at the ends so that it may be readily slipped over the framework and at each end the covering is provided with a hem or welt as 5 through which the draw strings 6 may be inserted and these strings may be drawn to give the required tension and their free ends are tied in the usual manner and as more clearly shown in Figure 4.

In order to prevent the covering from wrinkling oppositely arranged tension bars 7, 7 are inserted into the welts 5 at each end of the article and the end straps 8 are passed around these tension bars, approximately at their mid-portions, and these straps are then drawn to give the required tautness and releasably fastened in the usual manner by the buckles 9. These tension bars give a smooth surface to the covering 4 when the same is placed under the required tension to give the desired resiliency to the back rest.

In use the back of the user will rest against the forward side of the back rest and the weight of the body will cause the forward sides of the ends 1 to move toward each other, the curved bars 2 yieldingly resisting such movement and tending to straighten out thus imparting an added resiliency to the skeleton framework and the upper and lower inwardly curved rods or bars 3 will increase their curvature under the pressure and will curve further inwardly away from the back of the user so that the body of the user will not come into contact with any portion of the skeleton framework but will be completely supported by the flexible covering 4.

It will be noted that the ends of the back rest are open so that there will be a free circulation of air therethrough which will conduce to the comfort of the user and will prevent the clothing of the user from becoming soiled from perspiration.

The drawing and description disclose what is now considered to be a preferred form of the invention by way of illustration only while the broad principle of the invention will be defined by the appended claim.

What I claim is:

In a back rest a framework composed of substantially elliptical forwardly diverging ends, a plurality of forwardly curved rods connecting the rear side of the ends and upper and lower rearwardly curved rods connecting the upper and lower portions of said ends, said upper and lower rods lying in forwardly diverging planes, said ends and rods each being formed of flexible material and all being integrally joined together to form a unit.

CHARLES R. LAW.